United States Patent
Mann, III et al.

(10) Patent No.: US 10,151,397 B2
(45) Date of Patent: Dec. 11, 2018

(54) COMPOSITE VALVE PLUGS AND RELATED METHODS

(71) Applicant: Fisher Controls International LLC, Marshalltown, IA (US)

(72) Inventors: Julian Adin Mann, III, Ames, IA (US); Ted Dennis Grabau, Marshalltown, IA (US); Adam Taylor Boyle, Singapore (SG)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 15/365,636

(22) Filed: Nov. 30, 2016

(65) Prior Publication Data
US 2018/0149279 A1     May 31, 2018

(51) Int. Cl.
| F16K 25/00 | (2006.01) |
| F16K 27/02 | (2006.01) |
| F16K 1/36  | (2006.01) |
| B33Y 80/00 | (2015.01) |

(52) U.S. Cl.
CPC ............ F16K 25/005 (2013.01); B33Y 80/00 (2014.12); F16K 1/36 (2013.01); F16K 27/0254 (2013.01)

(58) Field of Classification Search
CPC ........................... F16K 25/005; F16K 27/0254
USPC ......................................................... 251/122
See application file for complete search history.

(56) References Cited

U.S. PATENT DOCUMENTS

| 3,679,169 | A | * | 7/1972 | Bedo | F16K 1/38 251/88 |
| 4,394,873 | A | * | 7/1983 | Switall | B41F 7/30 137/613 |
| 4,732,364 | A | * | 3/1988 | Seger | E21B 34/02 251/122 |
| 4,951,920 | A | * | 8/1990 | Tsuno | B29C 45/52 251/356 |
| 5,538,028 | A | * | 7/1996 | Lombardo | B67D 1/0456 137/12.5 |
| 9,103,447 | B1 | * | 8/2015 | Hager | B23P 15/001 |
| 2010/0001222 | A1 | | 1/2010 | Muzzo et al. | |
| 2010/0140530 | A1 | * | 6/2010 | Robison | F16K 1/38 251/368 |
| 2010/0186834 | A1 | * | 7/2010 | Brondum | F16K 11/0782 137/603 |

(Continued)

OTHER PUBLICATIONS

International Searching Authority, "International Search Report and Written Opinion," issued in connection with International Patent Application No. PCT/2017/060836, dated Feb. 6, 2018, 11 pages.

*Primary Examiner* — Seth W Mackay-Smith
(74) *Attorney, Agent, or Firm* — Hanley, Flight & Zimmerman, LLC (57) ABSTRACT

Example composite valve plugs and related methods are disclosed. Example apparatus disclosed herein include a valve plug tip, a valve plug body, and an additively deposited material. The valve plug tip includes a head portion and a tail portion extending from the head portion. The valve plug body includes a cavity extending from a first end of the valve plug body toward a second end of the valve plug body. The cavity matably receives the tail portion of the valve plug tip. The additively deposited material is bonded to the valve plug body to retain the tail portion of the valve plug tip in the valve plug body.

23 Claims, 9 Drawing Sheets

(56) References Cited

U.S. PATENT DOCUMENTS

| | | |
|---|---|---|
| 2013/0068987 A1 | 3/2013 | Sun et al. |
| 2013/0240063 A1* | 9/2013 | Beisel .................... F16K 25/04 137/546 |
| 2014/0137967 A1* | 5/2014 | Chen .................. C23C 14/0605 137/625.21 |
| 2014/0361208 A1* | 12/2014 | Tsuji .................... F01D 17/145 251/368 |
| 2016/0221106 A1* | 8/2016 | Bush ...................... B23K 9/232 |

* cited by examiner

COMPOSITE VALVE PLUGS AND RELATED METHODS

FIELD OF THE DISCLOSURE

This disclosure relates generally to fluid valves and, more particularly, to composite valve plugs and related methods.

BACKGROUND

Control valves are often used in process control plants or systems to control the flow of process fluids. Control valves typically include a valve plug (e.g., a metal valve plug) and a valve seat (e.g., a metal seat ring) that are disposed in a fluid path to control the flow of fluid. The valve plug typically includes a valve plug tip connected to a valve plug body. An actuator moves the valve plug between an open position and a closed position at which the valve plug tip engages the valve seat to form a seal.

In severe service applications such as, for example, in the hydrocarbon, metals and mining, and petrochemical industries, control valves may be subjected to severely erosive service conditions that can rapidly wear or reduce the operating life of the valve plug. For example, the valve plug may be exposed to flowing process fluids that contain entrained particulate (e.g., ceramic catalyst fines, sand and aggregate from downhole formations, etc.) that can damage a sealing surface of a valve plug tip made of metal.

Therefore, in severe service applications, valve plug tips made of ceramic materials are often employed to reduce damage caused by severely erosive process fluids that may otherwise damage metallic valve plug tips, thereby increasing the operating life of the valve plug. Although highly resistant to the erosive and/or corrosive effects of particulate and the like, such ceramic materials may be more brittle than metallic materials. Thus, the ceramic material valve plug tips may not withstand relatively high actuator thrust forces that are often required to provide a tight fluid flow shut-off. For example, the actuator imparts a relatively high seating load or force to the valve plug when the valve plug sealingly engages the valve seat to provide a relatively tight shut-off and prevent or restrict fluid flow through the passageway of the valve for on/off applications. Under such high loads, stress concentrations in a valve plug tip made of ceramic can cause the valve plug tip to fracture, shatter or crack.

SUMMARY

In one example, an apparatus includes a valve plug tip, a valve plug body, and an additively deposited material. The valve plug tip has a head portion and a tail portion extending from the head portion. The valve plug body has a first end, a second end, and a cavity extending from the first the second end. The cavity matably receives the tail portion of the valve plug tip. The additively deposited material is bonded to the valve plug body to retain the tail portion of the valve plug tip in the valve plug body.

In another example, an apparatus includes a valve plug tip and a bonding layer. The valve plug tip is composed of a first material. The first material includes a ceramic in a metallic matrix. The bonding layer is an additively deposited second material fused to the valve plug tip.

In another example, an apparatus includes a valve plug tip and an additively deposited material. The valve plug tip includes a bonding face. The additively deposited material is bonded to valve plug tip via the bonding face. The additively deposited material forms a bonding layer with the valve plug tip.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is distanced from the other part with one or more intermediate part(s) located therebetween. Stating that any part is in contact with another part means that there is no intermediate part between the two parts.

DETAILED DESCRIPTION

In conventional valve plugs used in severely erosive fluid applications, connection techniques (e.g., shrink fitting, brazing, bolting) to join a ceramic valve plug tip to a metallic valve plug body often involve forming valve plug tips that have geometries including sharp corners and/or bends. These conventional valve plug tip geometries, in addition to differing thermal expansion rates between the ceramic and metallic materials, may result in high stress concentrations in the valve plug tip and may render a conventional ceramic valve plug tip, which is typically relatively brittle, more susceptible to fracturing.

In general, the example valve plug apparatus described herein may be used with severely erosive process fluids such as, for example, process fluids (e.g., hydrogen fluids) having entrained particulate (e.g., ceramic catalyst) that often cause damage or erosion to conventional valve trim components. The example valve plug apparatus described herein may employ tungsten carbide or similarly composed valve plug tips that have a significantly increased resistance to fracturing and extended operational life compared to conventional valve plug tips composed of relatively brittle materials.

In some examples, the valve plug apparatus described herein include a valve plug tip composed of a ceramic composite material (e.g., a ceramic aggregate in a metallic matrix), a valve plug body composed of a metallic material, and an additively deposited material composed of the metallic material. The example valve plug apparatus described herein provide a mechanical connection between the valve plug tip and the valve plug body spread over a larger area than in a conventional valve plug. In some examples, spreading stresses caused by differing thermal expansion rates between the ceramic valve plug tip and the valve plug body and spreading thrust force stresses from an actuator driving the valve plug over the larger mechanical connection area reduces the risk of cracking the valve plug tip. Additionally, in some examples, the valve plug apparatus described herein provide a bonded connection between the ceramic composite valve plug tip and the metallic valve plug body that may further reduce the possibility of cracking the valve plug tip.

The example valve plug tip and the example valve plug body of the example valve plug apparatus described herein may have complementary shapes and/or interlocking features to retain the valve plug tip in the valve plug body. In such examples, an additively deposited material may be used to prevent separation of the valve plug tip from the valve plug body. In some examples, the additively deposited material is applied to the example valve plug tip to form a bonding layer of metallic material fused to the ceramic composite, to which the example metallic valve plug body may be mechanically joined. Thus, the example valve plug apparatus described herein provide erosive and fracture-resistant ceramic composite tips to protect a metallic valve plug body.

Figure 1:
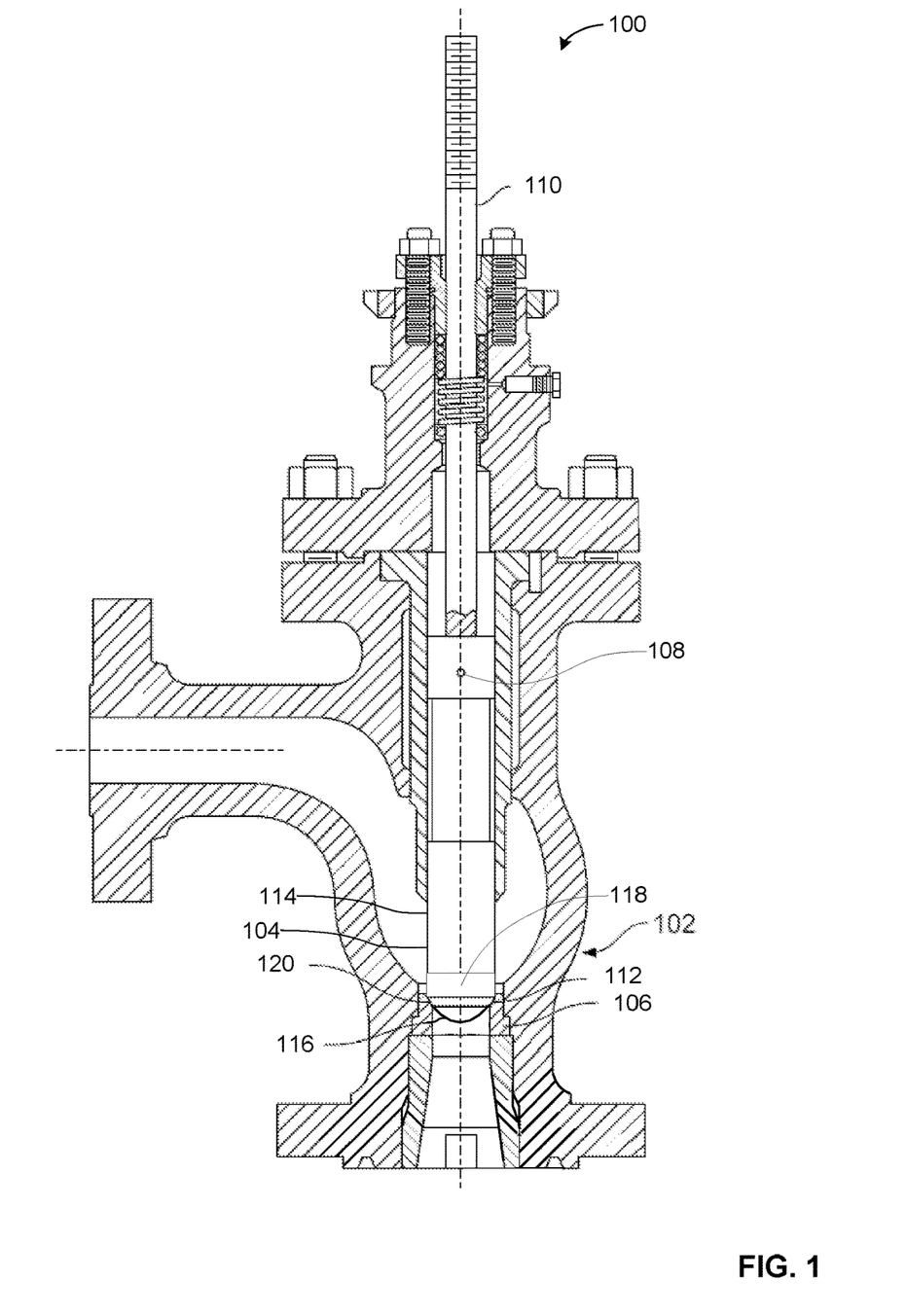
FIG. 1 illustrates an example control valve implemented with an example valve plug apparatus described herein.

FIG. 1 illustrates an example control valve implemented with an example valve plug apparatus described herein. More specifically, FIG. 1 shows a control valve assembly 100 (e.g., a flow down angle-style control valve) implemented with a valve trim apparatus 102 constructed in accordance with the teachings herein that may be used in severe service applications (e.g., severely erosive process fluid, high pressure applications, etc.). The valve trim apparatus 102 includes a flow control member or valve plug 104 and a valve seat or seat ring 106. In some examples, the valve plug 104 may further include a machined connection 108 (e.g., external threads, internal threads, a pin, a clamping ring, a flange, etc.) to mechanically couple the valve plug 104 to a valve stem 110. An actuator (not shown) (e.g., a pneumatic actuator, an electric actuator, a hydraulic actuator, etc.) may be operatively coupled to the valve stem 110 to move the valve plug 104 relative to the seat ring 106 to control fluid flow. Further, the seat ring 106 may have a seating surface 112 to sealingly engage with the valve plug 104.

The valve plug 104 may include a valve plug body 114 and a valve plug tip 116. In some examples, the valve plug 104 may further include an additively deposited material 118 to be described in greater detail below in conjunction with FIGS. 2-7. In some examples, the additively deposited material 118 may be deposited onto the valve plug body 114 and/or the valve plug tip 116. In some examples, the additively deposited material 118 may be deposited via methods including, but not limited to, directed energy deposition (DED), powder bed fusion (e.g., direct metal laser sintering (DMLS)), ultrasonic consolidation (e.g., sheet lamination), etc., to be described in greater detail below in conjunction with FIGS. 8-9. Further, the valve plug tip 116 may include a sealing surface 120 to sealingly engage with the seating surface 112 of the seat ring 106.

In operation, an actuator (not shown) drives the valve stem 110 and, thus, the valve plug 104 between a closed position at which the valve plug tip 116 is sealingly engaged with the seat ring 106 to prevent or restrict fluid flow and a fully open or maximum flow position at which the valve plug tip 116 is separated from the seat ring 106 to allow fluid flow.

In severely erosive fluid conditions, valve plug tips 116 and/or seat rings 106 made of composite ceramic materials are often employed because ceramic materials have relatively high resistance to erosive or corrosive fluid conditions and high pressure differential applications, thereby increasing the operating life of the valve plugs and/or valve seats. For example, referring to the example of FIG. 1, the valve plug tip 116 and/or the seat ring 106 may be made of a composite ceramic material. In some examples, the composite ceramic material may be a tungsten carbide ceramic aggregate cemented in a cobalt and/or nickel matrix. However, coupling the valve plug body 114 to the valve stem 110 via the machined connection 108 may require a complex mechanical fastening mechanism to which a metallic material may be better suited. Additionally or alternatively, as noted above, the composite ceramic valve plug tip 116 may become damaged (e.g., fracture, crack, shatter, etc.) due to thrust forces and/or seat loads imparted to the valve plug tip 116 via an actuator sized to provide tight shut-off control during on/off flow applications. In some examples, stresses induced in the composite ceramic valve plug tip 116 caused by differing thermal expansion rates between the materials of the composite ceramic valve plug tip 116 and of the valve plug body 114 increase the likelihood of damage to the valve plug tip 116. The larger area mechanical connection and/or bonding layer noted above may facilitate in preventing damage to the valve plug tip 116, as explained in greater detail below with the aid of FIGS. 2-7.

Figure 2:
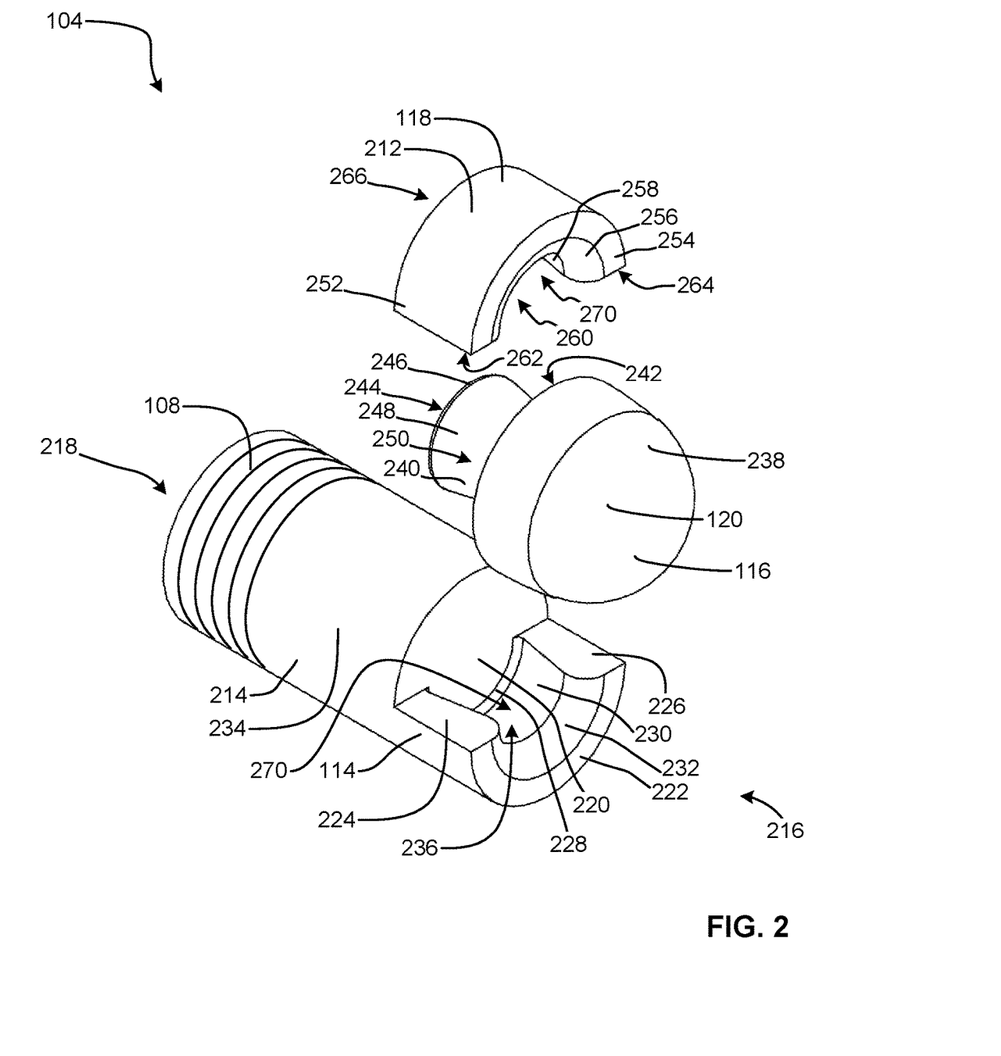
FIG. 2 is an enlarged and exploded view of an example arrangement of the example valve plug apparatus of FIG. 1.

FIG. 2 is an enlarged and exploded view of an example arrangement of the example valve plug apparatus of FIG. 1. In the illustrated example of FIG. 2, the valve plug 104 may include the valve plug body 114, the valve plug tip 116, and the additively deposited material 118 shaped as a retainer 212. The valve plug tip 116 may be geometrically retained in the valve plug body 114 by the retainer 212. In some examples, the valve plug tip 116 may be generally mushroom-shaped. However, the valve plug tip 116 may be formed to have other shapes to be retained in the valve plug body 114 by the retainer 212 including, but not limited to, "T"-shaped, stopper-on-stalk-shaped, butterfly-shaped, conical, hook-shaped, barbed, etc. In some examples, the valve plug tip 116 may be radially asymmetrical.

As shown in the example of FIG. 2, the valve plug body 114 may include a stem 214, a first end 216, a second end 218, a backing face 220, a body rim 222, a first body platform 224, a second body platform 226, an inboard body arcuate transition region 228, a body taper 230, an outboard body arcuate transition region 232, and a body exterior surface 234. Further, in some examples, the valve plug body 114 may carry the machined connection 108 described above and shown in FIG. 2 as an example threaded connection. As depicted in FIG. 2, the backing face 220 may be in contact with the first and second body platforms 224, 226, the first body arcuate transition region 228, and the body exterior surface 234. Further, the first and second body platforms 224, 226 may be in contact with the inboard body arcuate transition region 228, the body taper 230, the outboard body arcuate transition region 232, the body rim 222, and the body exterior surface 234. Additionally, the inboard body arcuate transition region 228 may be in contact with the body taper 230. The body taper 230 may be in contact with the outboard body arcuate transition region 232. The outboard body arcuate transition region 232 may be in contact with the body rim 222. The body rim 222 may be in contact with the exterior surface 234. Collectively, the backing face 220, the body rim 222, the first body platform 224, the second body platform 226, the inboard body arcuate transition region 228, the body taper 230, and the outboard body arcuate transition region 232 may define a body cavity portion 236.

In the illustrated example of FIG. 2, the valve plug tip 116 may include a head portion 238 and a tail portion 240. The head portion 238 may include the sealing surface 120 and a shoulder 242, better shown in FIGS. 3 and 5 and described in greater detail below. The shoulder 242 may be in contact with the sealing surface 120. The tail portion 240 may include a base 244, a tip inboard arcuate transition region 246, and a tip taper 248. As better shown in FIG. 3 and described below, the valve plug tip 116 may further include an outboard tip arcuate transition region 250. The base 244 may be in contact with the inboard tip arcuate transition region 246. The inboard tip arcuate transition region 246 may be in contact with the tip taper 248. The tip taper 248 may be in contact with the outboard tip arcuate transition region 250. The outboard tip arcuate transition region 250 may be in contact with the shoulder 242. Moreover, as will be explained in greater detail below in conjunction with FIG. 3, the tail portion 240 may be received in the body cavity portion 236.

As depicted in the example of FIG. 2, the retainer 212 may be additively constructed or formed to include a retainer exterior surface 252, a retainer rim 254, an outboard retainer arcuate region 256, and a retainer taper 258. As will be described below and better shown in FIG. 3, the retainer 212 may be additively constructed or formed to additionally include an inboard retainer arcuate transition region 260. Further, when viewed separately from the valve plug body 114 as depicted in FIG. 2, the retainer 212 may be additively constructed or formed to include first and second retainer platforms 262, 264 and a bottom 266. When viewed separately from the valve plug body 114, the first and second retainer platforms 262, 264 may be in contact with the inboard retainer arcuate transition region 260, the retainer taper 258, the outboard retainer arcuate transition region 256, the retainer rim 254, the bottom 266, and the retainer exterior surface 252. The inboard retainer arcuate transition region 260 may be contact with the retainer taper 258. The retainer taper 258 may be in contact with the outboard retainer arcuate transition region 256. The outboard retainer arcuate transition region 256 may be in contact with the retainer rim 254. Collectively, the retainer rim 254, the outboard retainer arcuate region 256, the retainer taper 258, the inboard retainer arcuate transition region 260, first and second retainer platforms 262, 264 and the bottom 266 may be additively constructed or formed to define a retainer cavity portion 268. The retainer 212 may be additively constructed or formed onto the valve plug body 114 and the valve plug tip 116 in a series of successive layers of the additively deposited material 118 bounded by the first and second body platforms 224, 226, the backing face 220, the inboard tip arcuate transition region 246, the tip taper 248, the outboard tip arcuate transition region 250, the shoulder 242, the body exterior surface 234, and the sealing surface 120. Thus, in some examples, the retainer 212 links (e.g., bridges, spans, connects, etc.) the first and second body platforms 224, 226. In some examples, the series of successive layers of the additively deposited material 118 forming the retainer 212 may be molten during deposition. As the retainer 212 is additively constructed or formed onto the valve plug body 114, the retainer 212 may become integral with, and thus a part of, the valve plug body 114. Further, the retainer 212 may be additively constructed around the tail portion 240. Thus, body cavity portion 236 and retainer cavity portion 268 may collectively form a cavity 270 and the tail portion 240 may be captured in the cavity 270. Further, the retainer 212 and the valve plug body 114 may work together to retain the valve plug tip 116 in the valve plug body 114 via the tail portion 240. Retention of the valve plug tip 116 according to the example of FIG. 2 is described in further detail below with the aid of FIG. 3.

Figure 3:
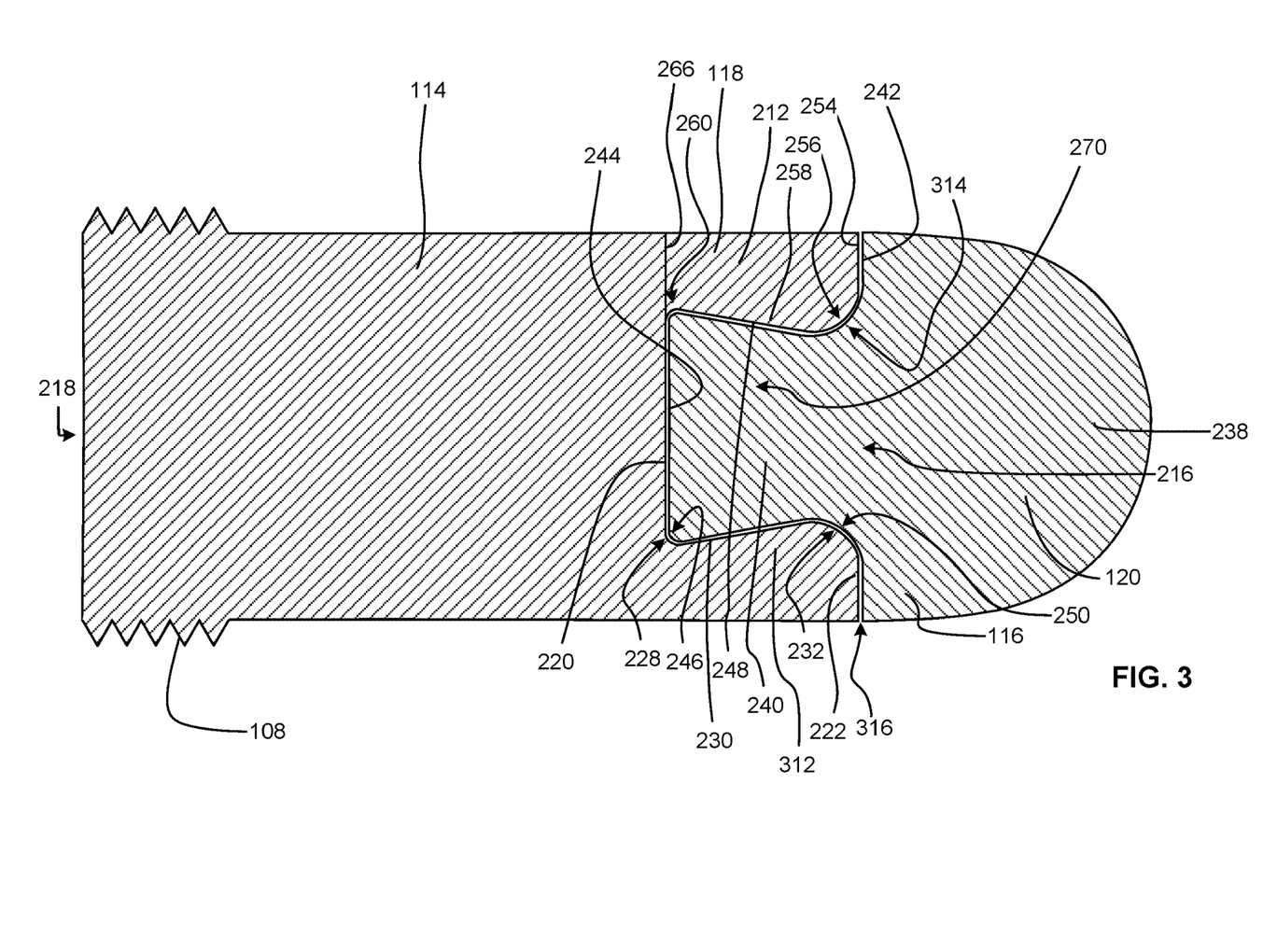
FIG. 3. is an assembled cross-sectional view of the example valve plug apparatus of FIG. 2.

FIG. 3. is an assembled cross-sectional view of the example valve plug apparatus of FIG. 2. In the illustrated example of FIG. 3, the valve plug tip 116 is depicted as installed in the valve plug body 114 and retained by the retainer 212. Thus, the cavity 270 is filled by the tail portion 240. The valve plug body 114 and the retainer 212 may be shaped to matingly correspond with the valve plug tip 116. For example, the backing face 220 may matingly correspond with the base 244. For example, the inboard body arcuate transition region 228 and the inboard retainer arcuate transition region 260 may matingly correspond with the inboard tip transition region 246. For example, the body taper 230 and the retainer taper 258 may matingly correspond with the tip taper 248. For example, the outboard body arcuate transition region 232 and the outboard retainer transition region 256 may matingly correspond with the outboard tip arcuate transition region 250. For example, the body rim 222 and the retainer rim 254 may matingly correspond with the shoulder 242. Additionally, the arcuate shapes of the arcuate transition regions 228, 232, 246, 250, 256, 260 may work to significantly reduce stress concentrations and to prevent fracture propagation in the valve plug body 114, retainer 212, and valve plug tip 116.

Further, as illustrated in FIG. 3, in some examples, the inboard body arcuate transition region 228, the body taper 230, the outboard body arcuate transition region 232, the body rim 222, the inboard retainer arcuate transition region 260, the retainer taper 258, the outboard retainer arcuate transition region 256, and the retainer rim 254 may collectively form a retaining collar 312. Thus, referring to FIGS. 2 and 3, as the retainer 212 links the first and second body platforms 224, 226, in some examples, the retaining collar 312 is contiguous (e.g., annular, ring-shaped). In some examples, the body taper 230 and the retainer taper 258 may narrow from the second end 218 toward the first end 216 (e.g., the cavity 270 may be conically shaped). In some examples, the tip taper 248 may narrow from the base 244 toward the head portion 238 (e.g., the tail portion 240 may be may be flared). Additionally, in some examples, the tip taper 248, the outboard tip arcuate transition region 250, and the shoulder 242 may collectively form a groove 314. As the retainer 212 is additively constructed around the tail portion 240, the retaining collar 312 may interlock with the groove 314. For example, the groove 314 matingly receives the retaining collar 314. For example, the retaining collar 314 matingly clasps into the groove 314. Thus, the retaining collar 312 may retain the valve plug tip 116 in the valve plug body 114 by capturing the flared tail portion 240. However, in some examples, a gap 316 may be left between the valve plug tip 116 and the valve plug body 114 and the retainer 212. In some examples, the gap 316 may allow for dissimilar expansion rates between the metallic valve plug body 114 and retainer 212 and the ceramic composite valve plug tip 116. As the valve plug 104 is heated during service upon exposure to hot fluids, the valve plug body 114 may expand to close the gap 316 and tighten against the valve plug tip 116. For example, the retaining collar 312 may tighten against the tail portion 240. More particularly, the body and retainer tapers 230, 258, the outboard body and retainer arcuate transition regions 232, 256, and the body and retainer rims 222, 254 may tighten against the tip taper 248, the outboard tip arcuate transition region 250, and the shoulder 242, respectively. Further examples to retain the valve plug tip in the valve plug body 114 are explained below in conjunction with FIGS. 4-7.

Figure 4:
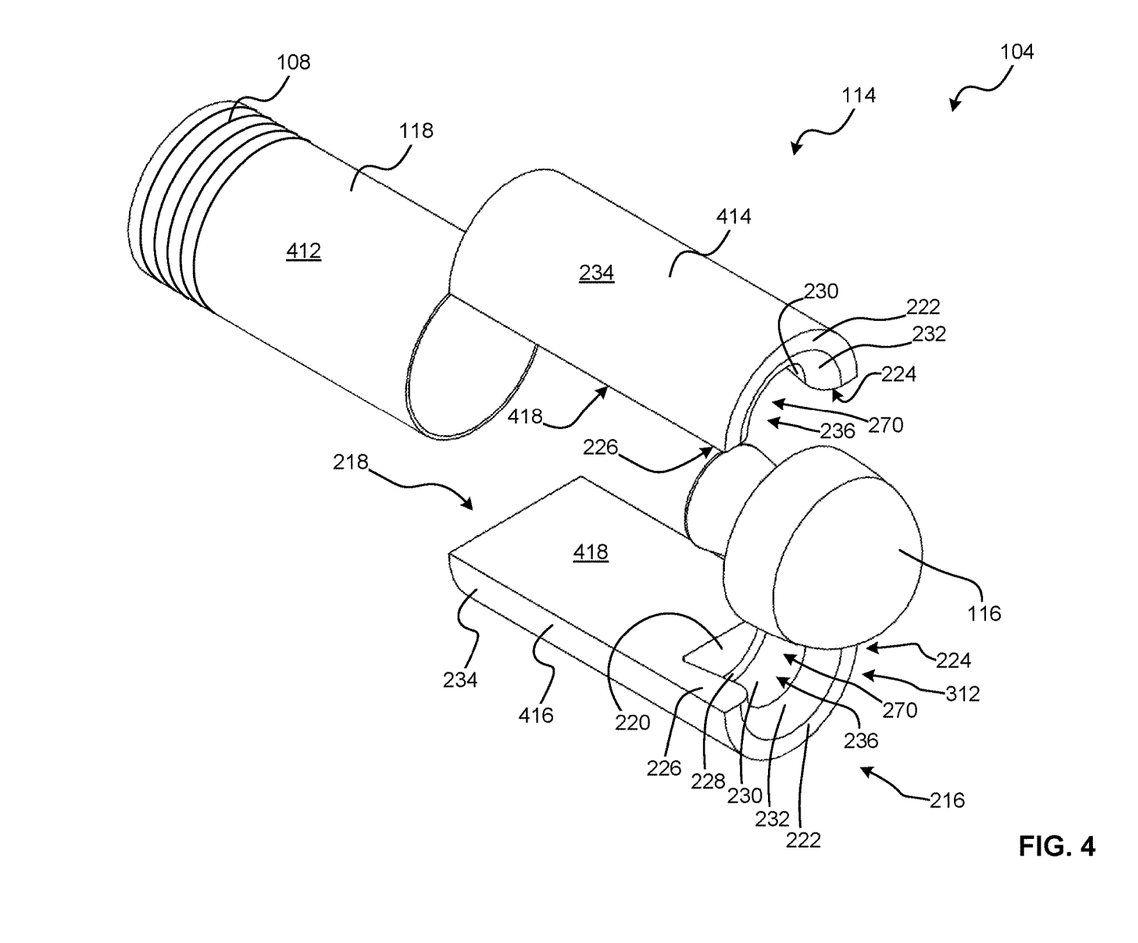
FIG. 4 is an enlarged and exploded view of an alternative example arrangement of the example valve plug apparatus of FIG. 1.

FIG. 4 is an enlarged and exploded view of an alternative example arrangement of the example valve plug apparatus of FIG. 1. In the illustrated example of FIG. 4, the valve plug 104 may include the valve plug body 114, the valve plug tip 116 and the additively deposited material 118 shaped as a sleeve 412. In some examples, the sleeve 412 may carry the machined connection 108. In some examples, as depicted in FIG. 4, the valve plug body 114 may include a first body portion 414 and a second body portion 416 (e.g., the valve plug body 114 may be divided axially from the first end 216 to the second end 218). The first and second body portions 414, 416 may be complementary to one another. The first and second body portions 414, 416 may be any complementary (e.g. balancing) division of the valve plug body 114 (e.g., halves, a crescent shape and a pie slice shape). The valve plug tip 116 may be geometrically retained between the first and second body portions 414, 416. Further, the sleeve 412 may hold the first and second body portions 414, 416 together (e.g., prevent the first and second portions 414, 416 from separating and thereby capturing the valve plug tip 116).

In some examples, the first and second body portions 414, 416 may each include the backing face 220, the body rim 222, the first and second body platforms 224, 226, the inboard arcuate transition region 228, the body taper 230, the outboard arcuate transition region 232, and the body exterior surface 234 defining the body cavity portion 236 described above. In the example of FIG. 4, the body cavity portions 236 of first and second body portions 414, 416 may define the cavity 270. Further, the first and second body portions 414, 416 may each include a mating face 418. Thus, in some examples, first and second body portions 414, 416 may be mirror images of one another.

In some examples, the sleeve 412 may be additively constructed about the first and second body portions 414, 416 to join and seal the first and second body portions 414, 416, thus capturing the valve plug tip 116 in the valve plug body 114. The sleeve 412 may be additively constructed onto the assembled first and second body portions 414, 416 in a series of successive layers of the additively deposited material 118. In some examples, the series of successive layers of the additively deposited material 118 forming the sleeve 412 may be molten during deposition. As the sleeve 412 is additively constructed or formed onto the first and second body portions 414, 416 of the valve plug body 114, the sleeve 412 may become integral with and, thus, a part of the valve plug body 114. Retention of the valve plug tip 116 according to the example of FIG. 4 is described in further detail below with the aid of FIG. 5.

Figure 5:
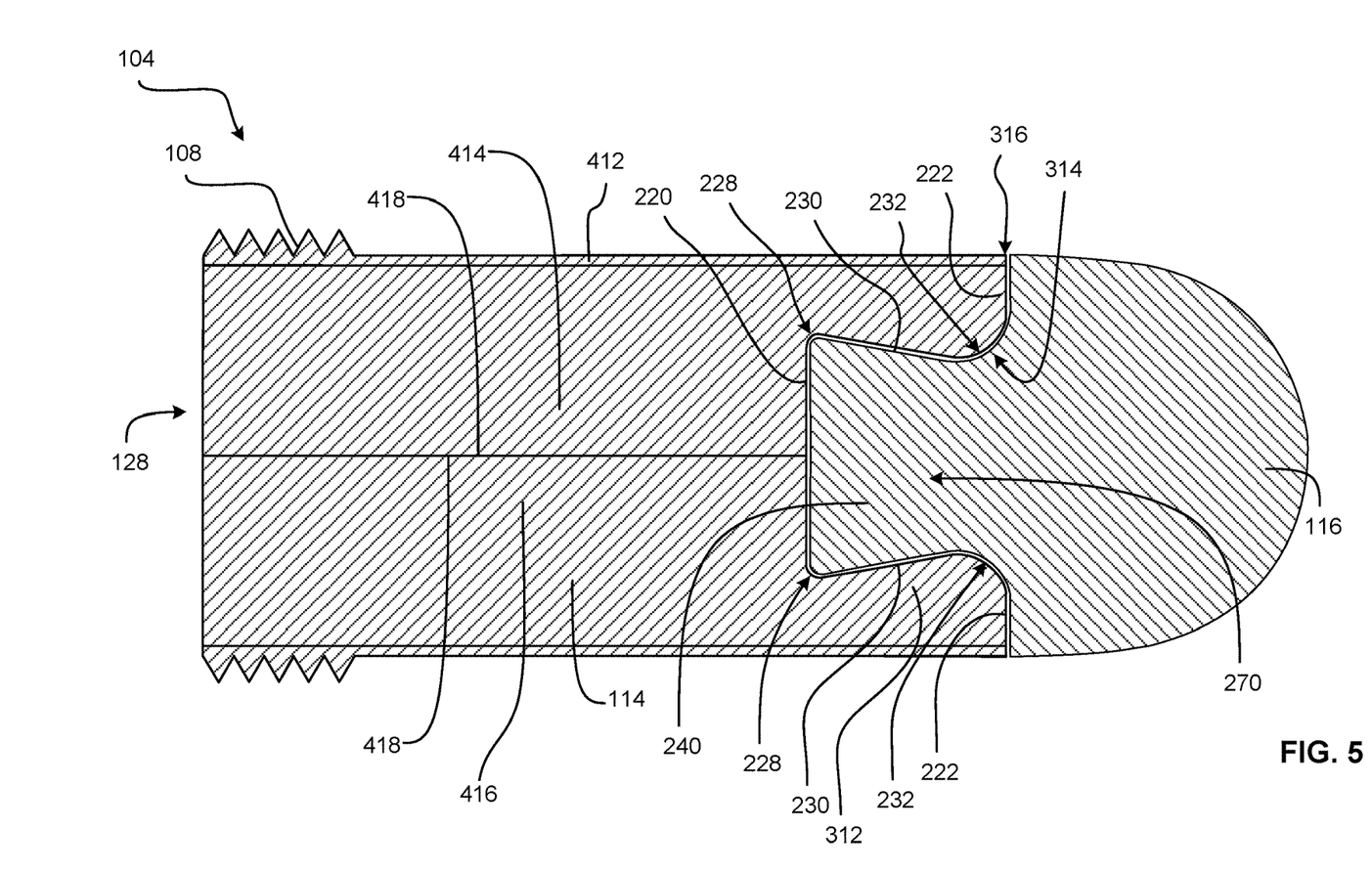
FIG. 5 is an assembled cross-sectional view of the alternative example valve plug apparatus of FIG. 4.

FIG. 5 is an assembled cross-sectional view of the alternative example valve plug apparatus of FIG. 4. As shown in FIG. 5, the first and second body portions 414, 416 are mated at the mating faces 418 to capture the valve plug tip 116 in the cavity 270. Further, in the example of FIG. 5, the sleeve 412 is additively constructed about the first and second body portions 414, 416 to enrobe the first and second body portions 414, 416 and thus holds the first and second body portions together to prevent the valve plug tip 116 from being released. Additionally, the sleeve 412 may be additively constructed and/or to form the machined connection 108.

In the illustrated example of FIG. 5, the tail portion 240 of the valve plug tip 116 is depicted as installed between the first and second body portions 414, 416, which are retained by the sleeve 412. Thus, similar to the example of FIG. 3, the cavity 270 is filled by the tail portion 240 of the valve plug tip 116. As shown in the example of FIG. 3, the first and second body portions 414, 416 may be shaped to matingly correspond with the valve plug tip 116 via the backing face 220, the inboard body arcuate transition region 228, the body taper 230, the outboard body arcuate transition region 232, and the body rim 222. Additionally, similar to the retainer 212 and valve plug body 114 described above in conjunction with FIG. 3, the arcuate shapes of the arcuate transition regions 228, 232 may work to reduce stress concentrations and to prevent fracture propagation in the first and second body portions 414, 416.

Further, as illustrated in FIG. 5, in some examples, the first and second body portions 414, 416 collectively form the retaining collar 312 via the arcuate transition regions 228, 232, the body tapers 230, and the body rims 222. In some examples, the valve plug tip 116 features the groove 314, as described above. As the first and second body portions 414, 416 are assembled about the valve plug tip 116, the retaining collar 312 may interlock with the groove 314, to retain the valve plug tip 116 in the valve plug body 114 as described above with respect to FIG. 3. However, similar to above with respect to FIG. 3, in some examples, the gap 316 between the valve plug tip 116 and the first and second body portions 414, 416 allows for dissimilar expansion rates between the metallic first and second body portions 414, 416 and the ceramic composite valve plug tip 116. Upon exposure to hot fluids during service, the first and second body portions 414, 416 may expand and tighten against the valve plug tip 116, thus closing the gap 316. Further examples to join the valve plug tip with the valve plug body 114 are explained below in conjunction with FIGS. 6-7.

Figure 6:
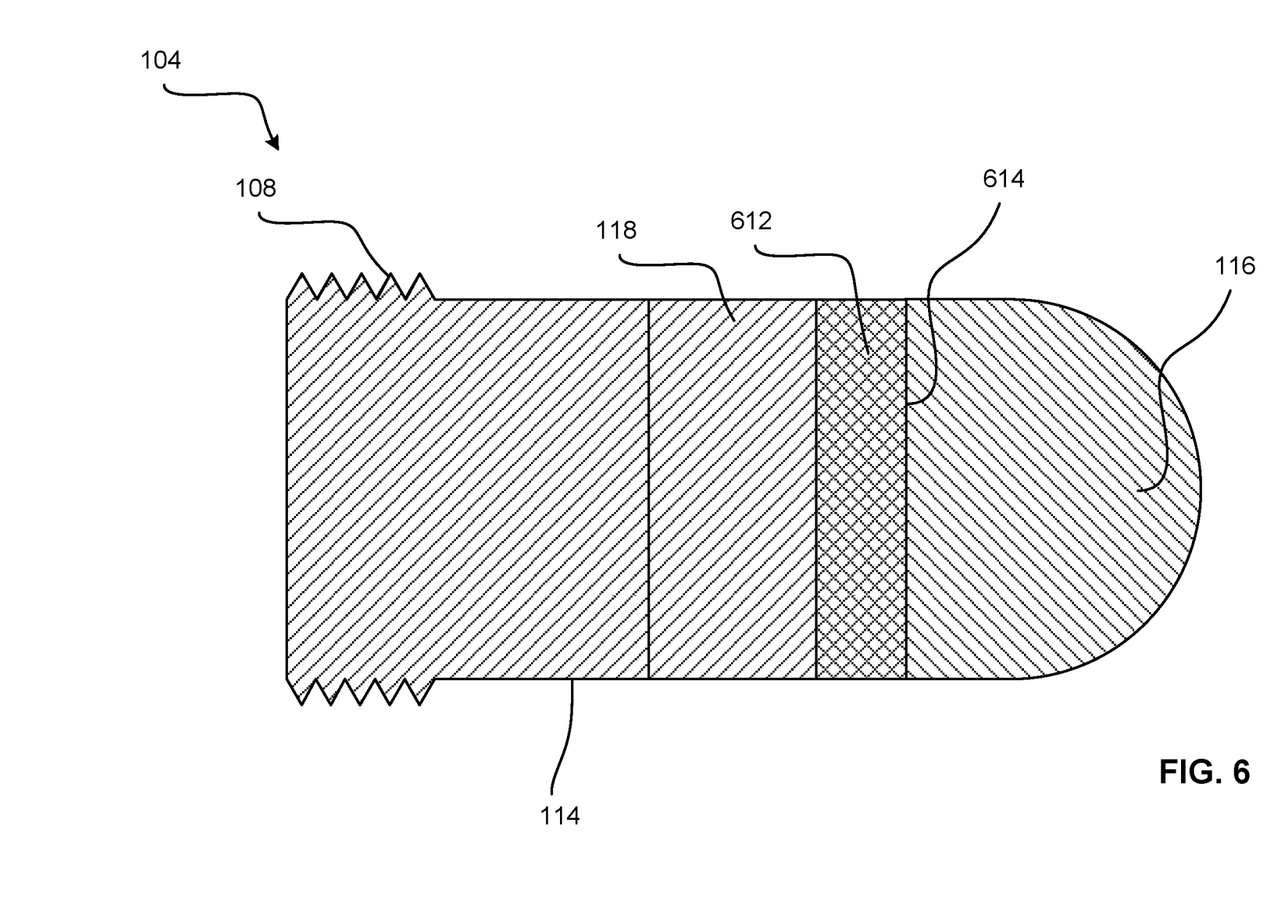
FIG. 6. is a cross-sectional view of another alternative example arrangement of the example valve plug apparatus of FIG. 1.

FIG. 6. is a cross-sectional view of another alternative example arrangement of the example valve plug apparatus of FIG. 1. As shown in FIG. 6, the valve plug 104 may include the valve plug body 114, the valve plug tip 116, the additively deposited material 118, and a bonding layer 612. In some examples, as depicted in FIG. 6, the valve plug tip 116 has a substantially flat bonding face 614. In some examples, the valve plug body 114 is bonded to the additively deposited material 118. In some examples the additively deposited material 118 is bonded to the bonding face 614 via the bonding layer 612. Additionally, the valve plug body 114 may be additively constructed and/or machined to form the machined connection 108. Bonding of the valve plug tip 116 according to the example of FIG. 6 is explained in greater detail below in conjunction with FIG. 7.

Figure 7:
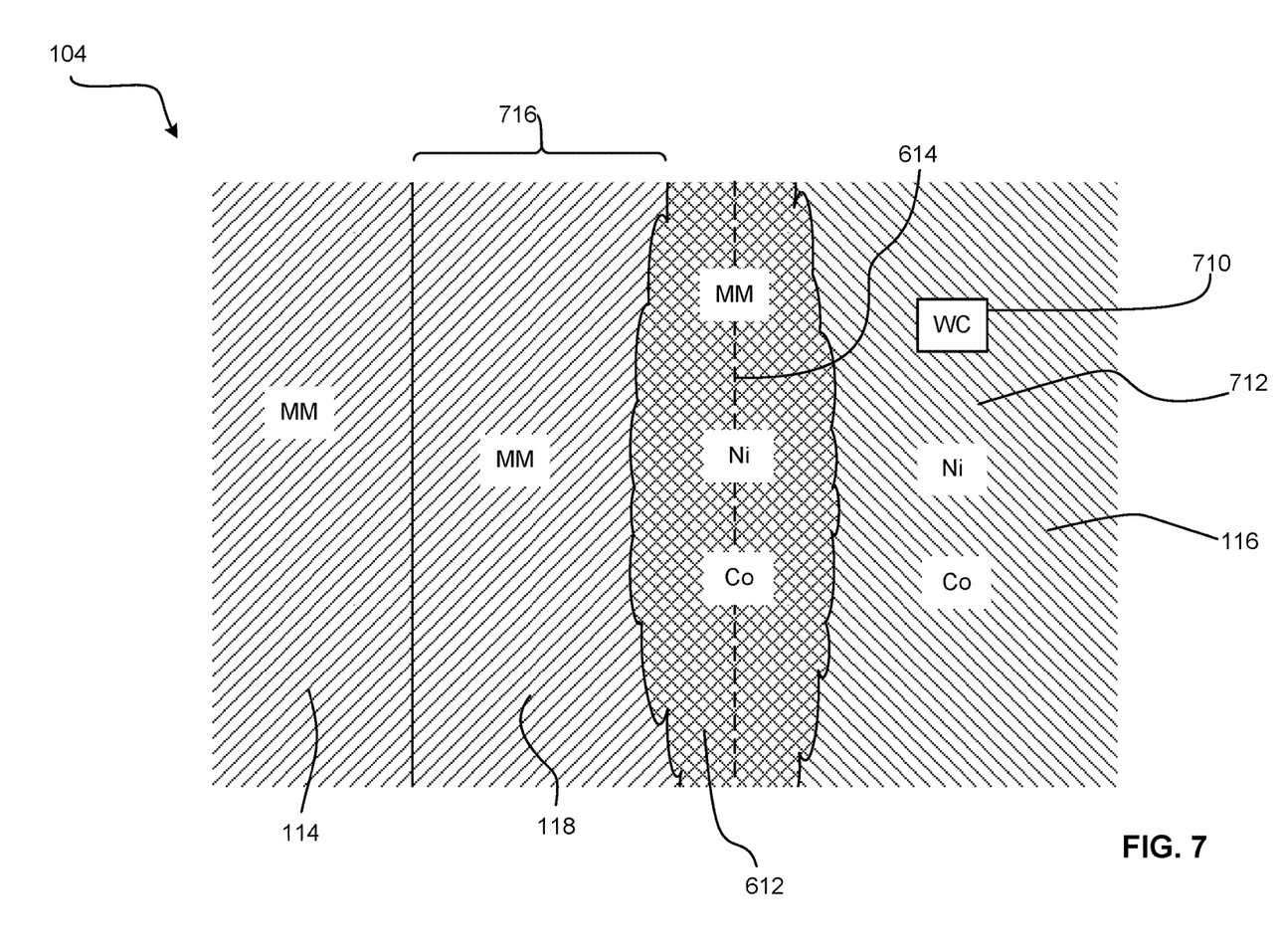
FIG. 7 is an enlarged cross-sectional view of the example valve plug apparatus of FIG. 6.

FIG. 7 is an enlarged cross-sectional view of the example valve plug apparatus of FIG. 6. As shown in the example of FIG. 7, the valve plug body 114 and the additively deposited material 118 are composed of substantially the same metallic material "MM." In some examples, the metallic material "MM" is ferrous (e.g., steel, stainless steel, "316" stainless steel, etc.). Also, as shown in the example of FIG. 7, the valve plug tip 116 is composed of ceramic aggregate 710 held in a metallic matrix 712 (e.g., a composite ceramic). In the example of FIG. 7, the ceramic aggregate 710 is tungsten carbide "WC" and the metallic matrix 712 includes nickel "Ni" and cobalt "Co." However, the ceramic aggregate 710 may be any type of ceramic and the metallic matrix 712 may include any metal. As the additively deposited material 118 is deposited in successive layers onto the bonding face 614, a portion of the metallic matrix 712 of the valve plug tip 116 may fuse with the additively deposited material 118 to form the bonding layer 612. In the example of FIG. 7, the bonding layer 612 thus includes nickel "Ni" and cobalt "Co" of the metallic matrix 712 fused with metallic material "MM" of the additively deposited material 118. Thus, the bonding face 614 may become diffused into (e.g., embedded, absorbed) the bonding layer 612. In some examples, the additively deposited material 118 is melted with a beam of a laser and deposited in successive molten layers (e.g., spread) over the bonding face 614 via directed energy deposition. In some examples, the additively deposited material 118 is deposited in successive layers as a powder and subsequently melted with a beam of a laser to spread over the bonding face 614 via powder bed fusion (e.g., direct metal laser sintering). In some such examples, the beam of the laser and/or the molten additively deposited material 118 melt the bonding face 614, causing a portion of the metallic matrix 712 of the valve plug tip 116 to fluidly commingle with the additively deposited material 118. In some such examples, the metallic matrix 712 and the additively deposited material 118 fuse together as the bonding layer 612 subsequently cools. Thus, in some examples, the bonding layer 612 is an alloy (e.g., an admixture, an amalgam, a fusion, a blend, a composite, etc.) of the additively deposited material 118 and the metallic matrix 712. In some such examples, cooling of the bonding layer 612 and/or the valve plug tip 116 may be controlled by applying the beam of the laser to the bonding layer 612 in a series of reduced intensities. Controlling the cooling of the bonding layer 612 and/or the valve plug tip 116 may prevent damage (e.g., fracturing, cracking, chipping, etc.) to the valve plug tip 116.

In some examples, the additively deposited material 118 is deposited in successive layers of sheets (e.g., foil, etc.) and subsequently welded over the bonding face 614 with a sonotrode via ultrasonic consolidation. In some such examples, ultrasonic vibrations produced by the sonotrode fuse the additively deposited material 118 to the metallic matrix 712 of the valve plug tip 116. Thus, the bonding layer 612 may be a mixture of the additively deposited material 118 and the metallic matrix 712. by additively depositing the additively deposited material 118 in successive layers onto the valve plug tip 116, energy input into the valve plug tip 116 may be relatively low as compared to, for example, conventional welding methods, casting, etc. Reducing the energy input applied to the valve plug tip 116 may prevent damage to the valve plug tip 116.

In some examples, further additively deposited material 118 is deposited onto the bonding layer 612 until a thickness 716 of additively deposited material 118 is achieved. In some examples, the valve plug body 114 is attached to the thickness 716 of additively deposited material via a conventional, relatively high-energy input welding method. However, in some examples, the valve plug body 114 is attached directly to the bonding layer 612. In some examples the thickness 716 and/or bonding layer 612 acts as a thermally insulative barrier (e.g., a heat shield, etc.) to protect the composite ceramic valve plug tip 116 from the high-energy input welding. However, in some examples, additive deposition of the additively deposited material 118 is continued to substantially form the valve plug body 114.

Figure 8:
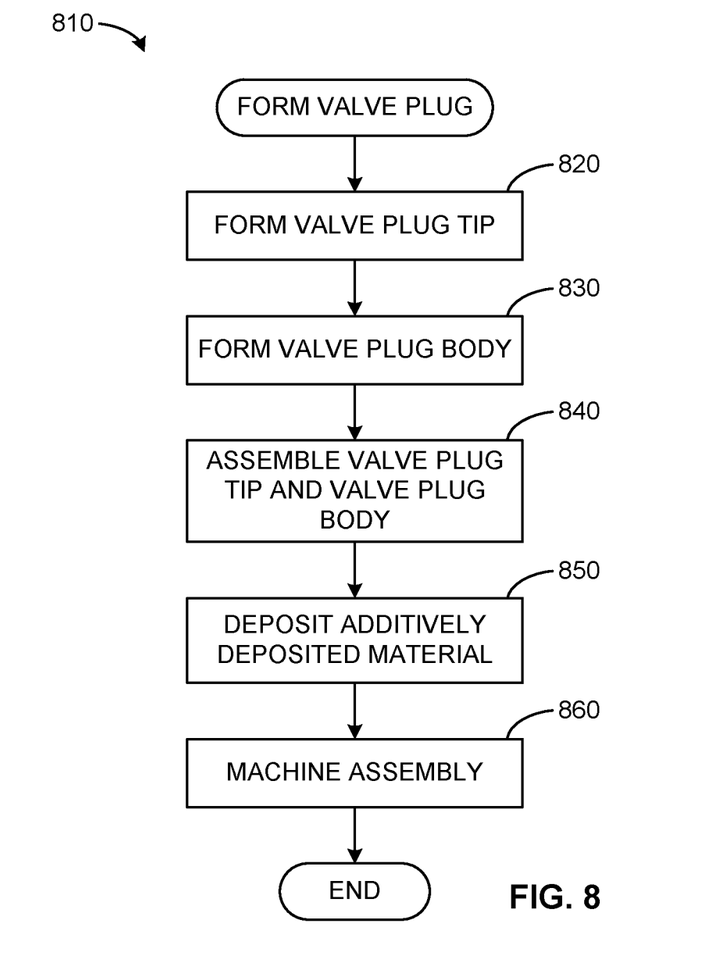
FIG. 8. is a flowchart representative of an example method that may be performed to construct the example valve plug apparatus of FIGS. 1-5.
Figure 9:
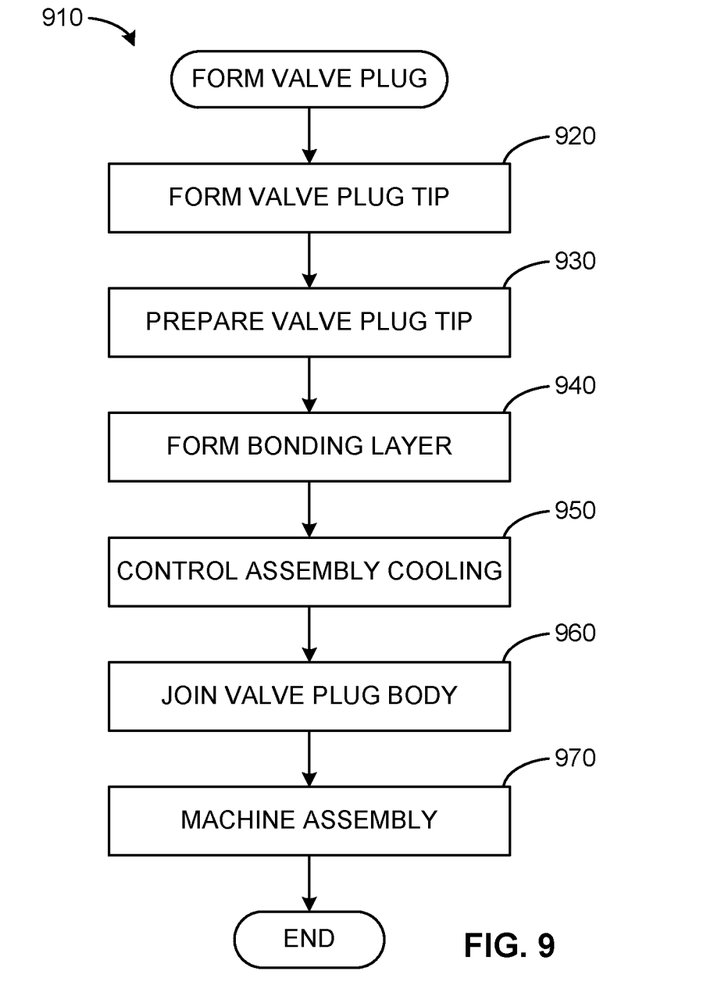
FIG. 9 is a flowchart representative of an alternative example method that may be performed to construct the example valve plug apparatus of FIGS. 1, 6, and 7.

While example methods of implementing the example valve plug 104 of FIGS. 1-7 are illustrated in FIGS. 8-9 one or more of the elements, processes and/or devices illustrated in FIGS. 8-9 may be combined, divided, re-arranged, omitted, eliminated and/or implemented in any other way. Further, the example methods of FIGS. 8-9 to construct the example valve plug tip 116, the example metallic matrix 712, the example bonding layer 612, the example thickness 716, the example additively deposited material 118, the example valve plug body 114 and/or, more generally, the example valve plug 104 of FIGS. 1-7 can be implemented by hardware, software, firmware and/or any combination of hardware, software and/or firmware using machine readable instructions. Further, for example, processes of FIGS. 8 and 9 to construct any of the example valve plug tip 116, the example metallic matrix 712, the example bonding layer 612, the example thickness 716, the example additively deposited material 118, the example valve plug body 114 and/or, more generally, the example valve plug 104 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). Additionally, any machine readable instructions used to execute at least one of the example methods of FIGS. 8-9 is/are hereby expressly defined to be encoded on a tangible computer readable storage device or storage disk such as a memory, a digital versatile disk (DVD), a compact disk (CD), a Blu-ray disk, etc. storing the software and/or firmware. Further still, the example methods of FIGS. 8-9 may include one or more elements, processes and/or devices in addition to, or instead of, those illustrated in FIGS. 8-9, and/or may include more than one of any or all of the illustrated elements, processes and devices.

Flowcharts representative of example methods to construct the example valve plugs 104 of FIGS. 1-7 are shown in FIGS. 8-9. In some examples, where the example methods are implemented using machine readable instructions, the machine readable instructions comprise a program for execution by a processor. The program may be embodied in software stored on a tangible computer readable storage medium such as a CD-ROM, a floppy disk, a hard drive, a digital versatile disk (DVD), a Blu-ray disk, or a memory associated with the processor, but the entire program and/or parts thereof could alternatively be executed by a device other than the processor and/or embodied in firmware or dedicated hardware. Further, although the example methods are described with reference to the flowcharts illustrated in FIGS. 8-9, many other methods of implementing the example valve plug may alternatively be used. For example, the order of execution of the blocks may be changed, and/or some of the blocks described may be changed, eliminated, or combined.

As mentioned above, the example methods of FIGS. 8-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 8-9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 8 is a flowchart representative of an example method 810 that may be executed to implement the example the valve plug 104 of FIGS. 1-5. The example method 810 may be performed, for example, to connect a composite ceramic valve plug tip to a metallic valve plug body.

A composite ceramic valve plug tip may be formed (e.g., cast sintered, machined, etc.) (block 820). Then, a metallic valve plug body may be formed, (e.g., cast, sintered, machined, additively manufactured etc.) (block 830). In some examples, the valve plug tip and the valve plug body are formed to have complementary shapes and/or interlocking features (blocks 820, 830). Next, the valve plug tip and the valve plug body may be assembled (block 840). In some examples, a tail portion of the valve plug tip is received in a cavity of the valve plug body. Further, additively deposited material may be deposited via an additive manufacturing process (e.g. direct energy deposition, powder bed fusion, ultrasonic consolidation, etc.) onto the valve plug body and, in some examples, the valve plug tip (block 850). In some examples, the additively deposited material retains the valve plug tip in the valve plug body. In some examples, the additively deposited material is formed as a retainer. In some examples, the additively deposited material is formed as a sleeve. Next, the assembled valve plug body, valve plug tip, and additively deposited material may be machined to, for example, remove burrs, engrave information, form a machined connection, etc. (block 860).

FIG. 9 is a flowchart representative of an alternative example method 910 which may be executed to implement the example the valve plug 104 of FIGS. 1, 6, and 7. The example alternative method 910 may be performed, for example, to bond a composite ceramic valve plug tip to a metallic valve plug body.

A composite ceramic valve plug tip may be formed (e.g., cast, formed from powdered metal and a suitable binder, sintered, machined, etc.) (block 920). In some examples, the composite ceramic is a ceramic material cemented in a metallic matrix. In some such examples, the ceramic material is tungsten carbide and the metallic matrix is nickel and/or cobalt. In some examples, the valve plug tip is formed to have a bonding face. Then, the valve plug tip is prepared for further processing (block 930). In some examples, preparing the valve plug tip includes cleaning and/or heating the valve plug tip. In some such examples, the valve plug tip is heated with a beam of a laser. Next, a bonding layer is formed on the valve plug tip via an additive manufacturing process (e.g., direct energy deposition, powder bed fusion, ultrasonic consolidation, etc.) (block 940). In some examples, the bonding layer is a mixture (e.g., an alloy) of the metallic matrix and a metallic material deposited by the additive manufacturing process. In some examples, the metallic material is ferrous (e.g., steel, stainless steel, etc.). In some examples, the bonding layer is formed on the bonding face of the valve plug tip. In some such examples, the bonding face is diffused into the bonding layer. Further, in examples where a beam of a laser was used to form the bonding layer (block 940), the assembled bonding layer and valve plug tip may be cooled in a controlled manner by applying the beam of the laser to the bonding layer in a series of reduced intensities (block 950). Next, a valve plug body may be joined to the valve plug tip via the bonding layer (block 960). In some examples, the valve plug body may be conventionally welded to the bonding layer. In some examples, the valve plug body may be additively constructed onto the bonding layer. In some examples, a thickness of the additively deposited material may be additively constructed onto the bonding layer and the valve plug body may be conventionally welded to the thickness. Additionally, the assembled valve plug body, valve plug tip, and additively deposited material may be machined to, for example, remove burrs, engrave information, form a machined connection, etc. (block 970).

From the foregoing, it will be appreciated that the above disclosed methods, apparatus and articles of manufacture may provide valve plugs with valve plug tips that are simultaneously well secured and resistant to fracturing, thus extending the operational life of the valve plug and the valve. Furthermore, utilizing the relatively low energy input of additive manufacturing methods to bond metallic materials to composite ceramics may provide layered structures (e.g., laminates) that are both hard (e.g., erosion resistant) and resilient (e.g., ductile, machinable, etc.).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a valve plug tip having a head portion and a tail portion extending from the head portion, the head portion having a sealing surface and a shoulder, the sealing surface to sealingly engage a seating surface of a seat ring when the valve plug tip is in a closed position, the tail portion having a first end located adjacent the shoulder, a second end located opposite the first end, and a tapered surface located between the first end and the second end;
   a valve plug body having a cavity extending from a first end of the valve plug body toward a second end of the valve plug body, the cavity matably receiving the tail portion of the valve plug tip; and
   an additively deposited material bonded to the valve plug body to retain the tail portion of the valve plug tip in the valve plug body.

2. The apparatus of claim 1, wherein the valve plug body is composed of a material substantially the same as the deposited material.

3. The apparatus of claim 1, wherein the deposited material is deposited via one of powder bed fusion, ultrasonic consolidation, or directed energy deposition.

4. The apparatus of claim 1, wherein the cavity has a first shape and the tail portion has a second shape complementary to the first shape to engage the cavity to retain the valve plug tip within the valve plug body.

5. The apparatus of claim 4, wherein the deposited material is further bonded to the valve plug tip to retain the valve plug tip in the valve plug body.

6. The apparatus of claim 5, wherein the deposited material includes a bonding layer immediately adjacent to the valve plug tip.

7. The apparatus of claim 6, wherein the bonding layer insulates the valve plug tip from subsequent deposition of the deposited material.

8. The apparatus of claim 4, wherein the valve plug body is divided axially from the first end to the second end to include a first body portion and a second body portion.

9. The apparatus of claim 8, wherein the deposited material is overlaid on the first and second body portions to join the first and second body portions and to capture the valve plug tip between the first and second body portions in the cavity.

10. The apparatus of claim 4, wherein the first shape includes a tapered surface.

11. The apparatus of claim 1, wherein the valve plug tip comprises tungsten carbide and the valve plug body comprises metal.

12. The apparatus of claim 1, wherein the first end of the valve plug body is adjacent the shoulder of the valve plug tip, and wherein the additively deposited material has a first end adjacent the shoulder of the valve plug tip.

13. The apparatus of claim 1, wherein the head portion of the valve plug tip has a first outer peripheral surface, the valve plug body has a second outer peripheral surface, and the additively deposited material has a third outer peripheral surface.

14. The apparatus of claim 13, wherein the second outer peripheral surface is flush with the first outer peripheral surface, and wherein the third outer peripheral surface is flush with the first outer peripheral surface and flush with the second outer peripheral surface.

15. The apparatus of claim 13, wherein the third outer peripheral surface is flush with the first outer peripheral surface, and wherein the additively deposited material is formed around the second outer peripheral surface.

16. An apparatus comprising:
a valve plug tip composed of a first material, the first material including a ceramic in a metallic matrix, the valve plug tip having a tip end, a base end located opposite the tip end, and a bonding face extending across the base end;
an additively deposited material composed of a second material different from the first material, the additively deposited material having a first end and a second end located opposite the first end, the first end of the additively deposited material being bonded to the bonding face via a bonding layer formed at the base end of the valve plug tip; and
a valve plug body having a first end and a second end located opposite the first end, the first end of the valve plug body being bonded to the second end of the additively deposited material, the valve plug body being composed of the second material;
wherein the valve plug tip further includes a first outer peripheral surface, the additively deposited material further includes a second outer peripheral surface, and the valve plug body further includes a third outer peripheral surface, and wherein the second outer peripheral surface proximate the first end of the additively deposited material is flush with the first outer peripheral surface proximate the base end of the valve plug tip, and the third outer peripheral surface proximate the first end of the valve plug body is flush with the second outer peripheral surface proximate the second end of the additively deposited material.

17. The apparatus of claim 16, wherein the first material is tungsten carbide and the second material is a metal.

18. The apparatus of claim 16, wherein the bonding layer includes second material alloyed with the metallic matrix.

19. The apparatus of claim 16, wherein the bonding layer is deposited via one of powder bed fusion, ultrasonic consolidation, or directed energy deposition.

20. The apparatus of claim 16, wherein the bonding layer insulates the valve plug tip from subsequent deposition of the second material.

21. An apparatus comprising:
a valve plug tip including a tip end, a base end located opposite the tip end, and a bonding face extending across the base end;
an additively deposited material including a first end and a second end located opposite the first end, the first end of the additively deposited material being bonded to the bonding face via a bonding layer formed at the base end of the valve plug tip; and
a valve plug body having a first end and a second end located opposite the first end, the first end of the valve plug body being bonded to the second end of the additively deposited material;
wherein the valve plug tip further includes a first outer peripheral surface, the additively deposited material further includes a second outer peripheral surface, and the valve plug body further includes a third outer peripheral surface, and wherein the second outer peripheral surface proximate the first end of the additively deposited material is flush with the first outer peripheral surface proximate the base end of the valve plug tip, and the third outer peripheral surface proximate the first end of the valve plug body is flush with the second outer peripheral surface proximate the second end of the additively deposited material.

22. The apparatus of claim 21, wherein the valve plug tip is composed of a ceramic in a metallic matrix and the additively deposited material is composed of a metallic material.

23. The apparatus of claim 22, wherein the bonding layer is an alloy of the metallic matrix and the metallic material.

* * * * *